US006831912B1

(12) United States Patent
Sherman

(10) Patent No.: US 6,831,912 B1
(45) Date of Patent: Dec. 14, 2004

(54) EFFECTIVE PROTOCOL FOR HIGH-RATE, LONG-LATENCY, ASYMMETRIC, AND BIT-ERROR PRONE DATA LINKS

(75) Inventor: Jon H. Sherman, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 09/523,924

(22) Filed: Mar. 9, 2000

(51) Int. Cl.$^7$ .............................. H04J 3/24; H04J 3/16; H04L 12/28

(52) U.S. Cl. ...................... 370/349; 714/748; 370/394; 370/465

(58) Field of Search .............................. 370/465, 310.1, 370/310.2, 316, 328, 338, 389, 392, 401, 473, 474, 349, 235, 229, 236, 231, 394; 714/748, 746, 749, 750; 709/227–228, 237

(56) References Cited

U.S. PATENT DOCUMENTS 5,163,046 A  * 11/1992 Hahne et al. ................ 370/465
5,426,635 A  *  6/1995 Mitra et al. .................. 370/229

(List continued on next page.)

FOREIGN PATENT DOCUMENTS

WO      WO 99/01968 A     1/1999
WO      WO 99/01968       1/2001

OTHER PUBLICATIONS

Mathis et al, Oct. 1996, RFC 2018: TCP Selective Acknowledgement Options.*
Jacob et al, 2002, Effectiveness of TCP SACK, TCP HACK and TCP trunk over Satellite Links, IEEE, pp. 3038–3043.*

Fox, R. "TCP Big Window and Nak Options," XP–002185117, retireved from Internet: http://www.strategis.com/rfc/RFC11XX/RFC1106.TXT.

FOX R: RFC 1106, Jun. 1, 1989.

XP–002185117.

*Primary Examiner*—Andy Lee
(74) *Attorney, Agent, or Firm*—Leonard A. Alkov

(57) ABSTRACT

A system for efficiently and reliably communicating over a high-speed asymmetric communications link. The system includes a first mechanism for connecting a first device to a second device via a channel. A second mechanism delivers data packets over the channel from the first device to the second device. Each packet is associated with a window of packets. A third mechanism selectively employs the second mechanism to re-send data packets not received by the second device after each window of packets. The window of packets is sized in accordance with the bandwidth of the communications link between the first device and the second device, and the round trip delay time. In a specific embodiment, the first mechanism (includes Transmission Control Protocol/Internet Protocol (TCP/IP) functionality on the first device and the second device for establishing a first TCP/IP link from the second device to the first device. The first mechanism also includes Universal Datagram Protocol (UDP) functionality on the first device and the second device for transferring UDP packets from the first device to the second device. The third mechanism sends acknowledgement messages from the second device to the first device specifying the packets not received by the second device. The system further includes a fourth mechanism for selectively disabling the second mechanism when first device does not receive an acknowledgement message after a predetermined time interval. The predetermined time interval is a function of a window timeout variable. The predetermined function is (M)×(window timeout), where M is approximately 2. The window timeout is greater than N multiplied by a number of packets included in the window of packets divided by the data rate of the communications link between the first device and the second device, here N is an integer greater than 1. N is between 3 and 10.

16 Claims, 4 Drawing Sheets

U.S. PATENT DOCUMENTS

| | | | | |
|---|---|---|---|---|
| 5,487,068 A | * | 1/1996 | Smolinske et al. | 370/450 |
| 5,636,230 A | * | 6/1997 | Marturano et al. | 714/748 |
| 5,764,625 A | * | 6/1998 | Bournas | 370/231 |
| 5,852,721 A | * | 12/1998 | Dillon et al. | 370/401 |
| 5,974,028 A | * | 10/1999 | Ramakrishnan | 714/748 |
| 6,038,606 A | * | 3/2000 | Brooks et al. | 709/235 |
| 6,076,114 A | * | 6/2000 | Wesley | 714/748 |
| 6,111,892 A | * | 8/2000 | Rittle et al. | 370/465 |
| 6,119,235 A | * | 9/2000 | Vaid et al. | 713/201 |
| 6,172,972 B1 | * | 1/2001 | Birdwell et al. | 370/349 |
| 6,415,329 B1 | * | 7/2002 | Gelman et al. | 370/401 |
| 6,646,987 B1 | * | 11/2003 | Qaddoura | 370/231 |

* cited by examiner

EFFECTIVE PROTOCOL FOR HIGH-RATE, LONG-LATENCY, ASYMMETRIC, AND BIT-ERROR PRONE DATA LINKS

This invention was made with Government support under Contract No. F33657-96-C-6501 awarded by the Department of the Air Force. The Government has certain rights in this invention.

THE BACKGROUND OF THE INVENTION

1. Field of Invention:

This invention relates to communications protocols. Specifically, the present invention relates to protocols employed for high-speed, long-latency, asymmetric, and bit-error prone data links.

2. Description of the Related Art:

Communications protocols are employed in various demanding applications including aircraft-to-ground communications and communications over satellite relays. Such applications require accurate and reliable protocols that maximize the use of available bandwidth over data links with long latencies (which are round trip signal delay times from sender to receiver), bit errors, and asymmetries (which include different downlink and uplink transmission rates).

In aircraft-to-ground and satellite-to-ground communications, control information is often transferred over the uplink from the ground to the aircraft or satellite while much data is transferred over the downlink from the aircraft to the ground. In such communications systems, downlink traffic from the aircraft or satellite to ground may be 1000 times greater than uplink traffic from ground to the satellite or aircraft. Data rates of hundreds of megabits per second are common for the downlink, while data rates of tens of kilobits per second are common for the up link. Such asymmetries reduce channel throughput and bandwidth utilization of communications systems employing conventional protocols such as Transmission Control Protocol/Internet Protocol (TCP/IP).

TCP/IP performance significantly degrades as bit errors, latencies, or asymmetries increase. Hence, TCP/IP is inappropriate for many applications. For example, TCP/IP requires an acknowledge packet for every received data packet.

Consequently, TCP/IP acknowledgement packets readily saturate the uplink of highly asymmetric channels.

LFNTCP aims to improve the accuracy of TCP/IP over high-speed asymmetric links. Unfortunately, LFNTCP still performs unacceptably in satellite relay tests. High data rates and large round trip delays reduce TCP or LFNTCP channel throughput to a small fraction of available bandwidth.

Communications systems employing TCP/IP or LFNTCP over high-speed asymmetric data links often use only a small fraction of expensive allotted bandwidth. The wasted bandwidth increases costs to effectively communicate data over the link, as more bandwidth is purchased to transfer more information.

Hence, a need exists in the art for an efficient and reliable protocol that maximizes the use of available bandwidth allocated for high-speed, asymmetric, long-latency, and/or error prone communications links. There exists a further need for an efficient communications system for accommodating the protocol.

SUMMARY OF THE INVENTION

The need in the art is addressed by the system for efficiently and reliably communicating over a high-speed asymmetric communications link of the present invention. In the illustrative embodiment, the inventive system is adapted for use with aircraft-to ground and satellite relay communications links. The system includes a first mechanism for establishing contact between a first device and a second device over a channel. A second mechanism delivers data packets over the channel from the first device to the second device. Each packet is associated with a window of packets. The window of packets includes a given number of bytes. Packets may vary in size. A third mechanism selectively employs the second mechanism to re-send data packets not received by the second device after each window of packets via a response message that encapsulates multiple missing packet identifications.

In a specific embodiment, the window of packets is sized in accordance with communications link bandwidth and the round trip delay time of the communications link. The first mechanism includes Transmission Control Protocol/Internet Protocol (TCP/IP) functionality on the first device and the second device for establishing a first TCP/IP link from the second device to the first device. The first mechanism also includes Universal Datagram Protocol (UDP) functionality on the first device and the second device for transferring UDP packets from the first device to the second device.

The third mechanism sends acknowledgement messages from the second device to the first device specifying the packets not received by the second device. The system further includes a fourth mechanism for selectively disabling the second mechanism when first device does not receive one of the acknowledgement messages after a predetermined time interval. The predetermined time interval is a function of a window timeout variable. The predetermined function is (M)×(window timeout), where M is approximately two. The window timeout is greater than N multiplied by ack-window worth of data divided by the data rate of the communications link between the first device and the second device, where N is an integer greater than 1. N is between 3 and 10.

Each packet includes a header having a file parameter and a sequence parameter that specify a file associated with each of the packets and a position in the file of each of the packets, respectively. The system further includes a fifth mechanism for assembling packets received by the second device via the second mechanism based on the file parameter and the sequence parameter.

The first device includes a transmit buffer for transmitting the packets, and the second device includes a receive buffer for receiving the packets. The size of the transmit buffer is a function of round trip signal travel time between the first device and the second device, a size associated with the acknowledge-window and a maximum data rate associated with the channel. The transmit buffer is approximately 50 megabytes for a 100 megabits per second channel. The size of the receive buffer is approximately equivalent to the size of the transmit buffer.

The novel design of the present invention is facilitated by the third means and the receive buffer of the second device. By employing a large receive buffer and sending negative acknowledgement messages indicating missing packets associated with prior missing packets after each window of packets, enhanced reliability and communications link throughput is achieved. This partly results from the fact that lost packets may be reinserted into the data stream without halting transmissions, and the fact that fewer acknowledgement messages (and fewer associated message headers and corresponding message overhead) are required to reliably communicate over the link. This reduces or eliminates the possibility of uplink saturation due to high data rates on the downlink.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
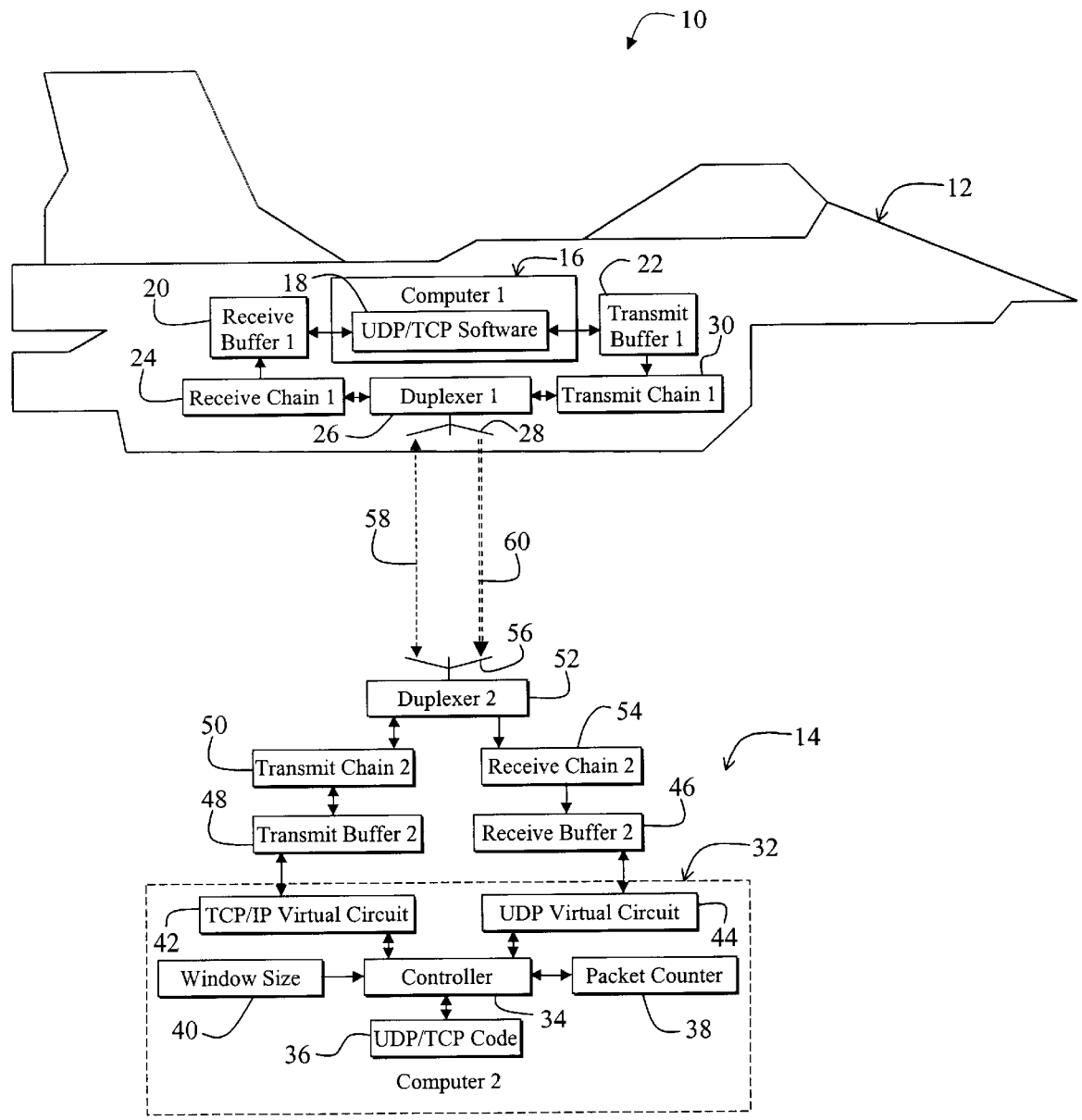
FIG. 1 is a diagram of an exemplary communications system constructed in accordance with the present invention and employing a unique protocol.

FIG. 1 is a diagram of an exemplary communications system 10 constructed in accordance with the present invention and employing a unique protocol. For clarity, various components, such as power supplies, hard drives, and so on, are omitted from FIG. 1, however, one skilled in the art with access to the present teachings will know where and how to implement the additional requisite components.

The system 10 includes an aircraft (server) 12 and a ground station (client) 14. The aircraft 12 has an aircraft computer 16 running unique Universal Datagram Protocol/Transmission Control Protocol (UDP/TCP) software 18, which is constructed in accordance with the teachings of the present invention. The computer 16 is in communication with a first receive buffer 20 and a first transmit buffer 22. An input of the first receive buffer 20 is connected to an output of a first receive chain 24, which is connected to a first duplexer 26, which is connected to an aircraft antenna 28. An output of the first transmit buffer 22 is connected to an input of a first transmit chain 30, which is also in communication with the antenna 28 via the duplexer 26.

The communications equipment employed in the ground station 14 is similar to the communications equipment employed in the aircraft 12. The ground station includes a ground station computer 32, which, for illustrative purposes, is expanded to show more detail than the aircraft computer 16. The ground station computer 32 includes a controller 34 in communication with a UDP/TCP code block 36, a received packet counter 38, a window size determination system 40, a TCP/IP virtual circuit 42, and a UDP virtual circuit 44. The TCP/IP virtual circuit 42 is in communication with a second transmit buffer 48. The second receive buffer 46 is also in communication with the UDP virtual circuit 44. An output of the second transmit buffer 48 is connected to an input of a second transmit chain 50, an output of which is connected to an input of a second duplexer 52. Similarly, an input of a second receive buffer 46 is connected to an output of a second receive chain 54, an input of which is connected to an output of the second duplexer 52. The second duplexer 52 is connected to a ground station antenna 56.

The UDP/TCP software 18 running on the aircraft computer 16 is analogous to the packet counter 38, the UDP/TCP code 36, the window size determination system 40, the TCP/IP virtual circuit 42, and the UDP virtual circuit 44 of the ground station computer 32. However, in the present specific embodiment, the software running on the ground station computer 32 acts as client software, while the UDP/TCP software 18 running on the aircraft computer 16 acts as server software.

In operation, the aircraft computer 16 is associated with an Internet Protocol (IP) address and has a TCP/IP socket, both of which are known at the ground station 14 and stored in memory (not shown) associated with the controller 34. Before communications with the aircraft 12, the ground station controller 34 employs the UDP/TCP code 36 to establish the TCP/IP virtual circuit 42 and the UDP virtual circuit 44.

The TCP/IP virtual circuit 42 is responsible for employing TCP/IP methods to send control signaling via an uplink 58 from the ground station 14 to the aircraft 12. The UDP virtual circuit 44 is responsible for receiving UDP-encoded packets transferred from the aircraft 12 via a high capacity downlink 60. In the present specific embodiment, the downlink 60 accommodates data rates many times greater than the uplink 58, resulting in an asymmetric channel 58, 60.

The ground station 14 connects to the TCP/IP socket (not shown) of the aircraft computer 16 via the TCP/IP virtual circuit 42, the transmit buffer 48, the second transmit chain 50, the second duplexer 52, the ground station antenna 56, the uplink 58, the aircraft antenna 28, the first duplexer 26, the first receive chain 24, and the first receive buffer 20. The duplexers 26 and 52 facilitate sharing of antenna resources between transmit and receive functions. Duplexers are known in the art.

The receive chains 24 and 54 include downconverters, filters, and mixers (not shown) necessary to convert received radio frequency (RF) signals to digital base band signals in preparation for digital processing and storage via the receive buffers 20 and 46, and the computers 16 and 32, respectively. Similarly, the transmit chains 30 and 50 include upconverters, filters, and mixers for preparing digital base band signals for RF transmission via the antennas 28 and 56, respectively. The constructions of transmit chains and receive chains are known in the art.

When the ground station 14 has connected to the TCP/IP socket of the aircraft computer 16, the TCP/IP virtual circuit sends an Initialization Message to the aircraft 12. The Initialization Message includes the IP address associated with the ground station computer 32 in addition to values for Ack_Window_Size and Ack_Window_Timeout. The Ack_Window_Size value is provided to the TCP/IP virtual circuit 42 via the window size generation system 40 and the controller 34. The Ack_Window_Size value represents the number of datagram packets or, alternatively, bytes of datagram packets that the ground station 14 will receive over the downlink 60 before sending an Acknowledgement Message to the aircraft 12 detailing missing packets. The Ack_Window_Size value is application-specific and is chosen in accordance with the data rate of the downlink 60 and the round trip delay, i.e., the round trip signal travel time between the aircraft 12 and the ground station 14. Hence, the packet window is sized in accordance with communications link bandwidth and the round trip delay of the link 58, 60. The Ack_Window_Size value may be adjusted by one skilled in the art to meet the needs of a given application.

Similarly, sizes of the second receive buffer 46 and the first transmit buffer 22 are application-specific and are chosen in accordance with the data rate of the downlink 60 and the round trip signal travel time between the aircraft 12 and the ground station 14. For a 100 megabits per second (Mb/s) downlink data rate and a relatively short round trip delay time, a suitable transmit buffer size may be approximately 50 megabytes.

In the present embodiment, receive buffers are sized in accordance with transmit buffer sizes and are approximately equivalent to the transmit buffer sizes. However, one skilled in the art will appreciate that different buffer sizes may be employed for transmit and receive buffers without departing from the scope of the present invention. The first receive buffer 20 and the second transmit buffer 46 are sized in accordance with the data rate of the uplink and are consequently much smaller than the first transmit buffer 30 and the second receive buffer 46.

The large client receive buffer 46 eliminates the need to interrupt transmission to retransmit packets over the downlink 60. Instead, packets are inserted in to the current data stream without stopping transmission. The greatly enhances the ability of the system 10 to maximize the use of available bandwidth.

The Ack_Window_Timeout value represents a time period after which if the ground station 14 has not received Ack_Window_Size bytes of datagrams from the aircraft 12, the ground station 14 sends an Acknowledgement Message to the Aircraft specifying the last packet received and all outstanding missing packets (not limited to missing packets associated with the last acknowledgement window). The acknowledgement window represents the previous Ack_Window_Size of bytes or the number of bytes in a previous time interval of Ack_Window_Timeout, whichever occurs first since transmission of the last Acknowledgement Message.

Each packet (also called a datagram) is associated with a file and a file sequence. The file and file sequence numbers enable the controller 34 to determine which packets are missing from previously transmitted datagrams by searching for missing sequence numbers.

When the aircraft 12 receives the Initialization Message from the ground station 14, the UDP/TCP software 18 generates a Return Initialization Message, which includes Max_Packet_Size and Initial_Sequence_No values. The Max_Packet_Size value specifies the maximum size (in terms of bits or bytes) of a datagram to be sent by the aircraft 12, while the Initial_Sequence_No value specifies the sequence number of the first datagram to be sent over the downlink 60.

Subsequently, the ground station 14 responds with an Acknowledgement Message constructed in accordance with the UDP/TCP code 36 and provided by the TCP/IP virtual circuit 42 to the aircraft 12 via the uplink 58. The initial Acknowledgement Message is null, indicating that no data was received by the ground station 14 from the aircraft 12.

When the aircraft 12 receives the initial Acknowledgement Message, the aircraft 12 begins sending data to the ground station 14 over the downlink 60 via UDP-encoded datagrams. The ground station 14 receives the UDP-encoded packets at high speeds over the downlink 60 and temporarily stores the received datagram packets in the second receive buffer 46. The receive buffer 46 is flushed to make way for new packets after analysis of packets in the receive buffer 46 by the UDP virtual circuit 44, the UDP/TCP code 36, and the controller 34 is complete. Received packets removed from the second receive buffer 46 are sorted into files by the controller 34 in accordance with file number and file sequence information included in the packets.

When the aircraft computer 16 receives an Acknowledgement Message from the ground station computer 32 specifying missing packets, the aircraft computer 12 releases, from the first transmit buffer 30, all packets that are not missing (positive acknowledgement) whose sequence numbers are less than or equal to the sequence number of the last packet received in the acknowledgement window.

Rather than sending an acknowledgement message for each missing packet and each received packet, which may saturate the uplink 58, the system 10 sends negative acknowledgements specifying missing packets after a predetermined number of bytes (corresponding to Ack_Window_Size) are received into the second receive buffer 46 or after a predetermined time period (Ack_Window_Timeout) has elapsed since the last Acknowledgement Message was sent to the aircraft 12. This unique acknowledgement system and method requires less up link bandwidth than existing systems and thereby allows for more complete utilization of the downlink capacity without saturating the uplink 58. A single acknowledgement message for multiple missing packets has a single header and therefore requires less overhead and link bandwidth than multiple acknowledgement messages and corresponding headers, one for each missing packet.

With access to the present teachings, one skilled in the art may design and build the UDP/TCP software 18 and UDP/TCP code 36 without undue experimentation. In a protocol stack, the UDP/TCP protocol layer is one layer above TCP/IP and UDP, and is on the same level as File Transfer Protocol (FTP). Alternatively, functionality needed to implement the communications system 10 may be purchased from Raytheon. Details of the various messages transferred between the server 12 and the client 14 are discussed more fully below.

The communications system 10 employs a unique UDP/TCP communications protocol constructed in accordance with the teachings of the present invention. UDP/TCP is a highly efficient and reliable network transport protocol that can efficiently and reliably operate over noisy, high-speed, very asymmetrical communications links with long round trip signal travel times. These types of communications links are common in satellite relay and RF line-of-sight data links, where the downlink (forward link) bandwidth may be hundreds of megabits per second and the uplink (reverse link) may be tens of kilobits per second.

UDP/TCP is an application level protocol that efficiently utilizes available bandwidth. UDP/TCP is positioned above TCP and UDP (at the same level a File Transfer Protocol (FTP)) in a network protocol stack (not shown). UDP/TCP efficiently uses both UDP/IP and TCP/IP.

UDP/TCP facilitates communications between the server 12 (aircraft) and the client 14 (ground station). The server 12 sends files of data to the client 14. For the purposes of the present discussion, a file is any large block of data treatable as a single unit.

A file is divided into packets. The maximum packet size, i.e., the maximum number of bytes that may be allocated for a given packet is determined by the server 12 via the UDP/TCP software 18 at connection initialization and stays constant during the connection. Methods for determining the maximum packet size are application-specific and may be developed by one skilled in the art to meet the needs of a given application.

The packets are transmitted from server 12 to client 14 as UDP-encoded packets. The client 14 collects packets in the second receive buffer 46. When number of packets with total byte count greater than a predetermined number of bytes (called the acknowledgement window size and stored in the variable Ack_Window_Size) is received by the client 14, the client 14 generates an Acknowledgement Message. As discussed above, the Acknowledgement Message specifies all unacknowledged packets (which were not received by the client 14) up to and including the last packet associated with the current acknowledgement window. The Acknowledgement Message describes which packets were received and which are missing. The acknowledgement window represents the previous packets whose aggregate byte count totals Ack_Window_Size or the packets received over a predetermined time period, such as Ack_Window_Timeout, as discussed more fully below.

The uplink 58 employs a TCP/IP protocol via the TCP/IP virtual circuit 48 and the TCP/UDP software 18, which facilitates message reception confirmation, i.e., acknowledgement. UDP/IP packets are sent over the downlink 60 at high data rates. Files are separated into UDP packets (datagrams) before transmission over the downlink 60. The downlink 60 requires path establishment, which is accomplished via initialization, as discussed more fully below. During initialization, the downlink 60 requires an Acknowledgment Message from the client 14. As discussed above, the Acknowledgement Message informs the server 12 which datagrams were received by the client 14 and which require re-sending.

Before initial downlink transmission and/or after a disruption of communication between the server 12 and the client 14, an Initialization Message is sent from the client 14 to the server 12. The server 12 establishes a communications port, such as COM 1, which is known by the client 14. Following the reception of the Initialization Message from the client 14, a Return Initialization Message is sent to the client 14, which establishes the communications links 58 and 60. The Initialization Message contains the number of the client port to which the server 12 may connect.

The Initialization Message is sent from the client 14 to the server 12 to direct the server 12 to send downlink data to the client 14. The Initialization Message is uplinked to the server 12 to initialize communications between the server 12 and the client 14. The Initialization Message is also uplinked to re-establish communications after breaks in communications between the client 14 and the server 12.

The Initialization Message includes a header and data words. Each data word in the Initialization message is four bytes (32 bits) long. The Initialization Message is constructed in accordance with the following table:

TABLE 1

Initialization Message

| Word Number | Contents |
|---|---|
| 1–4 | Header |
| 5–8 | Data |

The Initialization Message header includes a message counter and four words that define the size and type of the message. The format of the Initialization Message header is shown in the following table:

TABLE 2

Initialization Message Header

| Word Number | Name | Description |
|---|---|---|
| 1 | Sync | Synchronization |
| 2 | Message_Size | Message size |
| 3 | Message_Type | Message type |
| 4 | Message_Counter | Message counter |

The Initialization Message data contains information to initialize the link between the client 14 and the server 12. The Initialization Message contains the destination address for the downlink data, acknowledgment window size (Ack_Window_Size) and an acknowledgment time out (Ack_Window_Timeout). The message counter is incremented by one by the computer 32 each time an associated message is sent. An Acknowledgement Message is sent when the window size is reached or a timeout occurs.

The format of the Initialization Message data is shown in the following table:

TABLE 3

Initialization Message Data

| Word | Name | Description | Comments |
|---|---|---|---|
| 5 | Port_No | Port number | Port used by the client 14 for UDP socket |
| 6 | IP_Address | IP address | Client 14 IP address |
| 7 | Ack_Window_Size | Acknowledge Window Size | Number of bytes between acknowledgements |
| 8 | Ack_Window_Timeout | Acknowledge Window Timeout | Maximum time in milliseconds between acknowledgments |

The Return Initialization Message is sent from the server 12 to the client 14 in response to the Initialization Message uplinked from the client 14 to the server 12. The Return Initialization Message characterizes data packets by size and initial sequence and includes a header and data words. Each data word is four bytes long. The format of the Return Initialization Message is summarized in the following table:

TABLE 4

Return Initialization Message

| Word Number | Contents |
|---|---|
| 1–4 | Header |
| 5–6 | Data |

The Return Initialization Message header contains four words, including a counter, and words that define the message size and type. The format of the Return Initialization Message header shown in Table 3 is similar to the initialization header shown in Table 2.

The Return Initialization Message data specifies the maximum number of bytes in each forthcoming datagram and the first valid datagram sequence number. The format of the Return Initialization Message data is shown in the following table:

TABLE 5

Return Initialization Message Data

| Word | Name | Description | Comments |
|---|---|---|---|
| 5 | Max_Packet_size | Maximum size of packet (datagram) | Maximum number of bytes in a transmitted packet (datagram), including the header |
| 6 | Initial_Sequence_No | Initial sequence number | First valid sequence number to be transmitted |

The Acknowledgment Message is sent from the client 14 to the server 12 indicating the datagrams received by the client 14 and missing datagrams that require re-sending. The client 14 sends the Acknowledgement Message after the number of bytes specified in Ack_Window_Size have been received or after the time specified in Ack_Window_Timeout has passed. Both values are specified in the Initialization Message data described in Table 3. The Acknowledgement Message includes a header and data words. Each data word in the message is four bytes long. A summary of the Acknowledgement Message is shown in the following table:

TABLE 6

Acknowledgement Message

| Word Number | Contents |
|---|---|
| 1–4 | Header |
| 5–n | Data |

The Acknowledgement Message includes a counter, four words that define the message size and type, and information about the received datagrams. The format of the Acknowledgement Message header is identical to the Initialization Message header as in Table 2.

The Acknowledgement Message data contains a list of missing datagrams. The format of the Acknowledgement Message data is shown in the following table:

TABLE 7

Acknowledgement Message Data

| Word | Name | Description | Comments |
|---|---|---|---|
| 5 | Receive_MSG_Window | | Number of bytes available in the second receive buffer 46 of FIG. 1 |
| 6 | Last_Datagram_Acknowledged | | Highest datagram sequence number received |
| 7 | No_Missing_Datagrams | Number of missing datagrams | Number of datagrams listed in the data portion of the message |
| 8–n | Data | List of missing datagrams | A 4-byte word specifying the sequence number for each missing datagram. The total number of bytes = 4x(number of missing datagrams) |

Data sent by the server 12 over the downlink 60 is formed into datagrams, which red to the client 14 after the downlink 60 has been established. These datagrams, i.e., datagram messages are downlinked either upon request by the client 14, by predetermined timing, or as data becomes available.

A Datagram Message (datagram) includes a header and data words. Each data word is four bytes long. A datagram includes a predetermined number of data words. A datagram does not necessarily comprise a complete message. A message can include multiple datagrams. A datagram is formatted in accordance with the following table:

TABLE 8

Datagram Message

| Word Number | Contents |
|---|---|
| 1–9 | Header |
| 10–n | Data |

The header of a datagram includes of nine 4-byte words. The header is constructed in accordance with the following table:

TABLE 9

Datagram Message Header

| Word | Data | Comments |
|---|---|---|
| 1 | Sync | 0xC01DBEEF |
| 2 | Size_of_Header | Size = 9 words (36 bytes) |
| 3 | Datagram_Sequence_Number | Greater than zero and incremented for each consecutive packet |
| 4 | Destination | User defined integer specifying destination/routing code |
| 5 | Oldest_Datagram_Available | Oldest packet available for retransmission |
| 6 | Datagram_Byte_Size | Number of bytes in data portion of datagram, excluding header |
| 7 | File_ID | Greater than zero, incremented for each consecutive file, and used to associate all packets that are segments of this file |
| 8 | File_Segment_No | Used to determine file packet position of this packet when reassembling the associated file |
| 9 | Segments_In_File | Specifies the number of packets in the file associated with this packet |

During normal operation of the communication system 10, the server 12 segments files into packets, i.e., datagrams, prior to transmission via the UDP/TCP software 18 and/or standard file segmentation software (not shown) running on the aircraft computer 16. These packets are saved in the large transmit buffer 30. The transmi0t buffer 30 depends on the maximum data rate, round trip transfer time, and the size of the acknowledgement window (Ack_Window_Size).

Each packet includes, in its header, a sequence number describing its sequence in the overall data stream. The packet header also contains a file identification number, a file segment number, and the number of segments in the associated file. The client 14 employs these parameters to reassemble the packets, thereby reconstructing the file associated with the packets.

Each packet transmitted from the server 12 to the client 14 is a UDP datagram. The server 12 keeps each transmitted packet in its transmit buffer 30 until receipt of the packet has been acknowledged by the client 14.

The client 14 stores received packets in its receive buffer 46. In the present embodiment, the second receive buffer 46 is sized to match the size of the corresponding transmit buffer 30.

When the client 14 has received a number of packets whose cumulative size is greater than or equal to the Ack_Window_Size, the client 14 generates and sends an Acknowledgement Message as defined above. This Acknowledgement Message specifies the sequence number of the last packet received by the client 14 and includes a list of sequence numbers of missing packets. In the present specific embodiment, for a data rate of 100 megabits per second, Ack_Window_Size is approximately two megabytes. Lower data rates require smaller acknowledgement window sizes. In the present embodiment, Ack_Window_Size is always at least 10 percent larger than the data rate multiplied by the round trip delay.

If the client 14 receives no data for a time equal to the Ack_Window_Timeout, then the client 14 sends an Acknowledgement to the server 12. The Ack_Window_Timeout is set such that Ack_Window_Timeout>N×Ack_Window_Size/Data_rate, where N is between 3 and 10, and Data_rate is the maximum data rate or bandwidth of the channel 58, 60.

The server 12 typically receives an Acknowledgement Message at least every Ack_Window_Timeout. When the server 12 receives an Acknowledgement Message, the server 12 releases all acknowledged packets from the first transmit buffer 30 and immediately retransmits all missing packets listed in the Acknowledgement Message. Missing packets that have been re-sent remain in the first transmit buffer 30 until they have been acknowledged by the client 14 via an Acknowledgement Message(s).

If the server 12 does not receive an Acknowledgement Message for a period exceeding M×Ack_Window_Timeout, where M is approximately 2, then the server 12 stops sending data and waits for the next Acknowledgement Message to restart sending data.

This prevents many retransmit requests being generated when link connection (see 58 and 60) is temporarily lost. If the link 58, 60 is lost, and the server 12 continues sending data, the client 14 receives nothing, and the server 12 receives no Acknowledgement Messages. When the link 58, 60 reconnects, if server 12 has been sending continuously, client 14 would generate a long list of missing packets. This would create congestion on a narrow bandwidth link from client 14 to server 12. This situation is avoided by the present invention via the use of the message timeout functionality discussed above. The server 12 stops sending after not receiving Acknowledgement Messages. Consequently, the total data that must be re-sent is limited.

A Receive_MSG_Window field is included in acknowledgement messages sent from the client 14 to the server 12 and is used to tell server 12 the number of bytes free in the second receive buffer 46. The server 12 subtracts the number of bytes still in transit from the Receive_MSG_Window to form an adjusted receive window. The adjusted receive window represents the number of packets sent by server 12 but not yet acknowledged by client 14. Sender will stop sending packets if the adjusted receive window reaches zero. This prevents overflowing of the second receive buffer 46.

Before the client 14 requests that a missing packet be retransmitted, the client 14 compares the packet number with an Oldest_Datagram_Available value included with the last received packet. If the missing packet is older than the Oldest_Datagram_Available, then retransmission is not requested, and all packets that are part of the same file are flushed from the receive buffer. This condition should not occur during normal operation, but may occur during startup.

Data traveling over the downlink 60 and acknowledgement messages traveling the uplink 58 are asynchronous. Many UDP packets may have been sent or may be currently in transit between the time that an uplink Acknowledgement Message is sent and the time the Acknowledgement Message is received by the aircraft 12. The sender, i.e., the aircraft 12 continues sending data if data is available to send. When an Acknowledgement Message is received by the aircraft 12, the aircraft responds to the message by sending any requested packets to the ground station 14 via the downlink 60.

Figure 2:
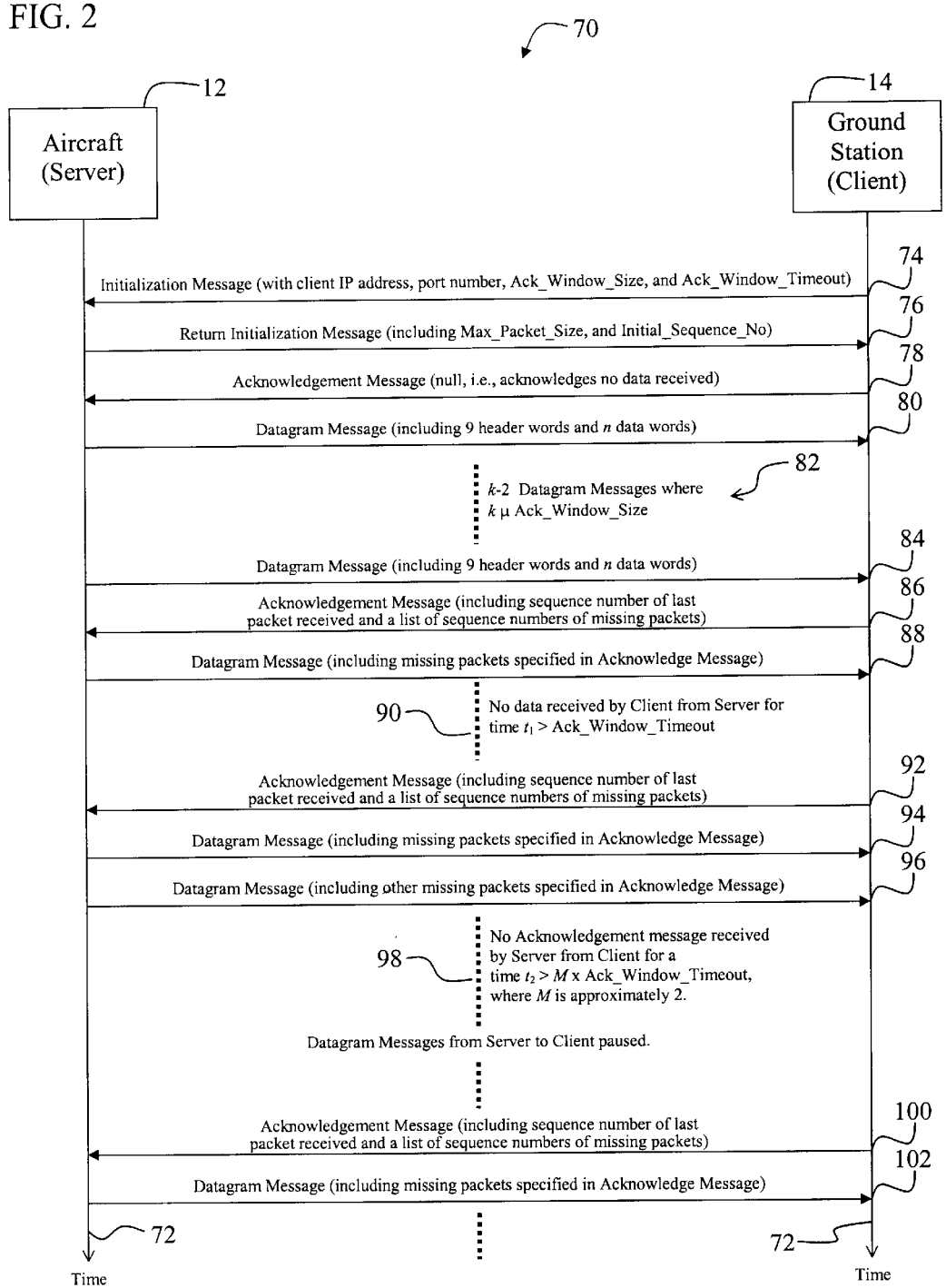
FIG. 2 is a message flow diagram illustrating a first exemplary message flow for the communications link of FIG. 1.

FIG. 2 is a message flow diagram illustrating an exemplary message flow 70 for the communications links 58 and 60 of FIG. 1 between the aircraft 12 and the ground station 14. The message flow 70 includes time axis 72 along which time increases from top to bottom. Initially, with knowledge of the IP address and communications port number (COM port) associated with the aircraft 12, the ground station 14 connects to and sends an Initialization Message 74 to the aircraft 12. The Initialization Message 74 includes the IP address and communications port number associated with the ground station 14 in addition to Ack_Window_Size and Ack_Window_Timeout values.

The aircraft 12 responds with a Return Initialization Message 76, which includes Max_Packet_Size and Initial_Sequence_No values. Upon receipt of the Return Initialization Message 76 by the ground station 14, the ground station 14 sends an Acknowledgement Message 78. The Acknowledgement Message indicates that the Return Initialization Message was received and that the ground station 14 has received no data from the aircraft 12. The messages 74, 76, and 78 are initialization messages.

Upon receipt of the Acknowledgement Message by the aircraft 12, the aircraft 12 begins sending data via a Datagram Message 80 and subsequent Datagram Messages 82. In the present example, after k Datagram Messages, including a last Datagram Message 84, are sent by the aircraft 12 and received by the ground station 14, the ground station 14 sends an Acknowledgement Message 86 to the aircraft 12. The Acknowledgement Message 86 specifies packets or datagrams missing from the previous Datagram Messages 80, 82, 84. The Acknowledgement Message 86 includes the sequence number of the last packet received by the ground station 14 and a list of sequence numbers of missing packets.

With reference to FIGS. 1 and 2, the missing packet determination is made by the ground station 14 via software running on the ground station 14 (see UDP/TCP code 36 and controller 34 of FIG. 1) by analyzing sequence numbers associated with datagrams in the second receive buffer 46. The missing sequence numbers correspond to missing packets. The ground station 14 then removes received packets from the second receive buffer 46 and stores them in memory (not shown) on the computer 32 in preparation for file reassembling.

Subsequently, upon receipt of the Acknowledgement Message 86, the aircraft 12 releases all packets in the first transmit buffer 30 not indicated as missing in the Acknowledgement Message 86 from the ground station 14 and then transmits an additional Datagram Message 88 to transmit any missing packet(s) to the ground station 14.

In the present example, a timeout period ($t_1$) 90 elapses during which no Acknowledgement Message is sent by the ground station 14. After the timeout period 90, the ground station 14 sends another Acknowledgement Message 92 indicating missing packets associated with the time out period 90. Datagram messages 94 and 96 are sent to the ground station 14 and include missing packets specified in the Acknowledgement Message received from the ground station 14. Datagram Messages (not shown) continue to be sent after any previously missing datagrams are received and acknowledged by the ground station 14.

Subsequently, a message timeout period 98 $t_2$>M×Ack_Window_Timeout elapses during which no Acknowledgement Message is received by the aircraft 12. In the present embodiment, M is approximately 2. After the message timeout period 98, the aircraft 12 stops sending any additional Datagram Messages and waits for an Acknowledgement Message from the ground station 14. After a subsequent Acknowledgement Message 100 is received by the aircraft 12, the aircraft 12 resumes sending Datagram Messages 102.

Missing packet determination involves use of a transport level error detection mechanism. For systems employing Asynchronous Transfer Mode (ATM), this transport level mechanism is the Cyclic Redundancy Check-32 (CRC-32). For systems employing High Level Data Link Control (HDLC), this mechanism is CRC-16. In both ATM and HDLC applications, failure of the CRC check at the receiving interface hardware causes the packet to be dropped.

With reference to FIG. 1, each datagram packet sent via the downlink 60 is associated with a sequence number. Suppose for example, that a given window of packets having datagrams associated with sequence numbers of 1 through 100 are sent over the downlink 60, but datagrams corresponding to sequence numbers of 17, 45, 77, and 85 are not received by the ground station 14. The ground station 14 (ground) then sends an Acknowledgement Message over the uplink 58 indicating the missing packets, i.e., packets 17, 45, 77, and 85. Subsequently, the ground station 14 receives datagrams 101 through 120 in sequence and then receives datagrams 17, 77, and 85 in response to the Acknowledgement Message. When the ground station 14 receives datagram 77, then the ground station 14 assumes that datagram 45 was lost in re-transmission. If the ground station 14 has not received datagram 45 before sending a subsequent Acknowledgement Message, the ground station 14 incorporates a request for datagram 45 in the subsequent Acknowledgement Message. The Acknowledgement Message specifies missing packets by listing missing datagram sequence numbers up to the highest sequence number already received. These missing packets may be associated with previous windows.

Any packets with sequence numbers lower than the sequence number of the last acknowledged packet that are not listed as missing after a certain time interval are assumed by the aircraft 12 (air) to have been received by the ground station 14. Such packets are free to be discarded by the aircraft 12. The discarded packets are unavailable for retransmission.

Figure 3:
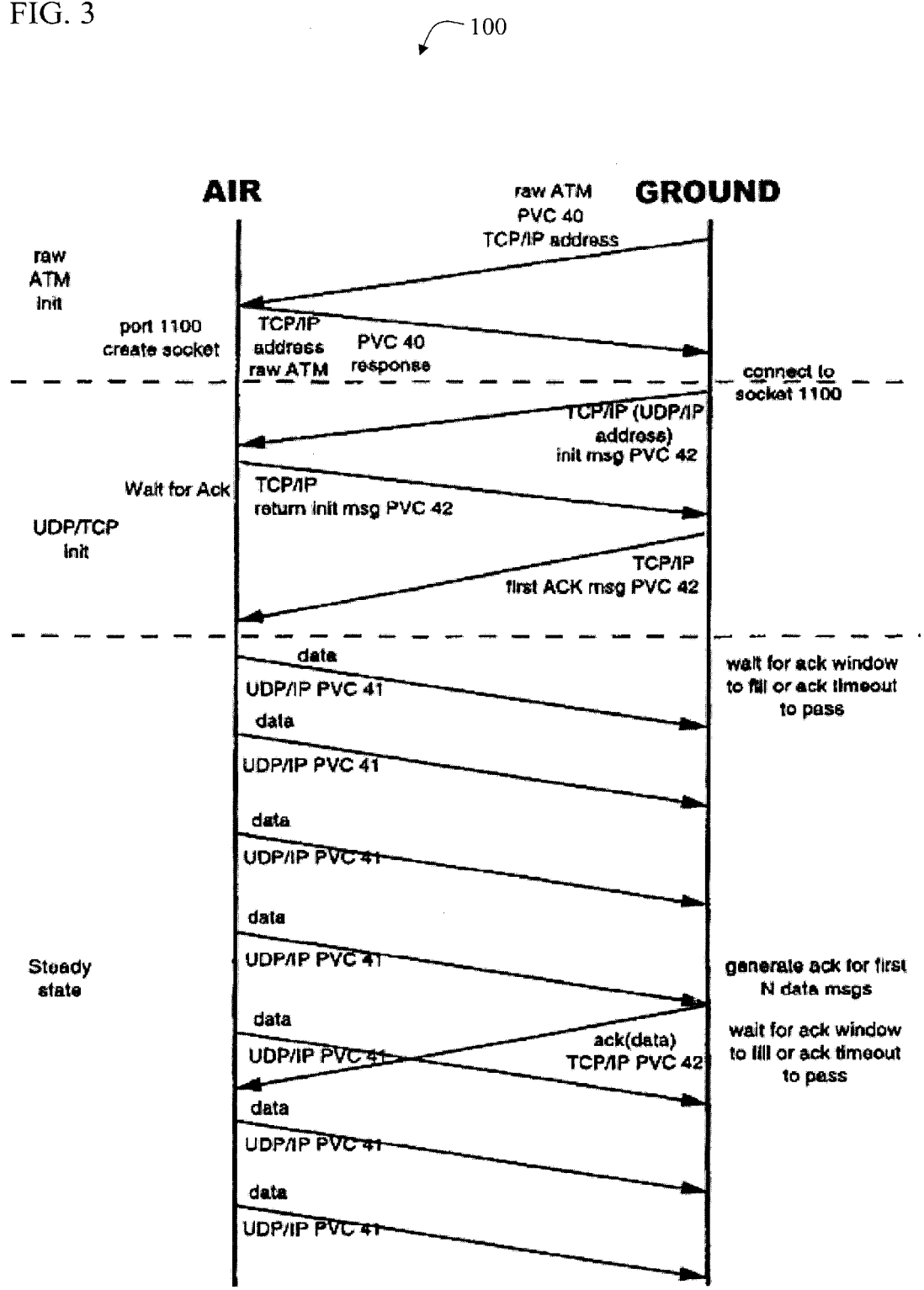
FIG. 3 is a message flow diagram illustrating a second exemplary message flow for the communications link of FIG. 1.

FIG. 3 is a message flow diagram illustrating a second exemplary message flow 100 for the communications link of FIG. 1. Note that for the steady state condition of the message flow 100, that the transmission of datagrams (UDP/IP PVC 41 data) is not halted for Acknowledgement Messages (TCP/IP PVC 42 ack(data)).

Figure 4:
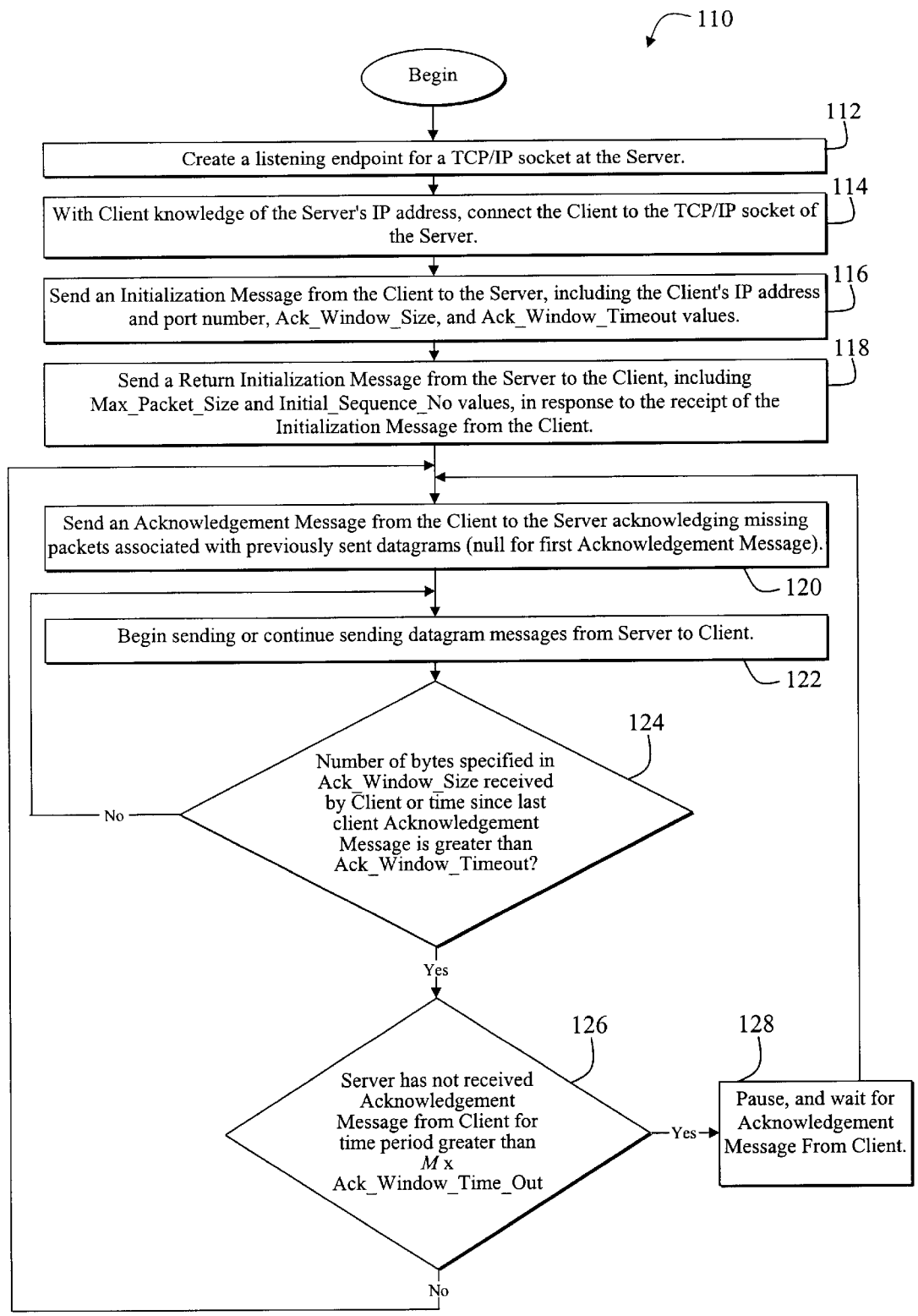
FIG. 4 is a flow diagram illustrating a unique method representative of the unique protocol of FIG. 1.

FIG. 4 is a flow diagram illustrating a unique method 110 representative of the unique UDP/TCP protocol of FIG. 1. With reference to FIGS. 1 and 3, in an initial step 112, a listening endpoint is created for a TCP/IP socket via the UDP/TCP software 18 running on the computer 16 of FIG. 1. Subsequently, control is passed to an initial connection step 114.

In the initial connection step 114, the aircraft ground station (client) 14 connects to the TCP/IP socket (not shown) associated with the aircraft computer 16. The ground station 14 has a priori knowledge of the IP address and TCP/IP socket associated with the aircraft (server) 12. After the connection is established between the client 14 and the server 12, control is passed to an initialization step 116.

In the initialization step 116, the client 14 sends an Initialization Message to the server 12, which includes the client's IP address and port number, the size of the acknowledgement window in bytes (Ack_Window_Size) and $t_2$(Ack_Window_Timeout). Upon receipt of the Initialization by the server 12, control is passed to a return initialization step 118.

In the return initialization step 118, the server 12 sends a Return Initialization Message to the client 14. The Return Initialization Message includes the maximum size in bytes of datagrams to be sent (Max_Packet_Size) and an Initial_Sequence_No corresponding to the file sequence number of the first datagram to be sent by the server 12. Upon receipt of the Return Initialization Message by the client 14, control is passed to an acknowledgement step 120.

In the acknowledgement step 120, the client 14 sends an Acknowledgement Message to the server 12. The Acknowledgement Message, as discussed above, indicates missing packets associated with previously sent datagrams. The Acknowledgement Message is null if it is the first Acknowledgement of the communications session. Upon receipt of the Acknowledgement Message by the server 12, control is passed to a data-sending step 122.

In the data-sending step 122, the server 12 sends a Datagram Message to the client 14. The datagram message includes a packet having one or more data words as discussed above. Control is then passed to a first timeout-checking step 124.

In the first timeout-checking step 124, the client 14 determines a time period $t_1$>Ack_Window_Timeout has elapsed since the last sending of an Acknowledgement Message by the client 14. The first timeout-checking step 124 also determines if the number of bytes specifies in the Ack_Window_Size variable output from the window size determination system 40 of FIG. 1 has been received since the last acknowledgement message. If $t_1$>Ack_Window_Timeout or (received bytes since last client Acknowledgement Message)>Ack_Window_Size, then control is passed to a subsequent second timeout-checking step 126. During the timeout-checking step 124 and a subsequent second time-out checking step 126, datagram messages are continuously sent due to the data-sending step 122. Data sending is only paused in a subsequent pausing step 128, which is discussed more fully below. Datagrams continue to be sent over the downlink 60 (see FIG. 1) even while acknowledgement messages are being sent over the uplink 58 of FIG. 1 (Datagrams and Acknowledgement messages may cross in transit). Acknowledgement Messages may be sent from the ground station 14 to the aircraft without interrupting the flow of datagrams from the aircraft 12 to the ground station 14.

In the second timeout-checking step 126, the server 12 determines if an Acknowledgement Message from the client 14 has not been received for a time period of $t_2$, where $t_2$>M×Ack_Window_Timeout, where M is approximately 2, as discussed above. If a time $t_2$ has elapsed since the receipt by the server 12 of the last Acknowledgement Message, then control is passed to a pausing step 128.

In the pausing step 128, the server 12 stops sending data until an Acknowledgement Message is received by the server 12 from the sender 14. After the server 12 receives an Acknowledgement Message, control is passed back to the acknowledgement step 120.

If in the timeout-checking step 126 determines that $t_2$ has not elapsed since the receipt of the last client Acknowledgement Message, then control is passed to a window-checking step 124. If at any time the communications link 58, 60 is broken, the method 70 exits.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications and embodiments within the scope of the present invention.

Accordingly,

What is claimed is:

1. A system for efficiently and reliably communicating over a high-speed asymmetric communications link comprising:
    first means for establishing contact between a first device and a second device over a channel;
    second means for delivering data packets over said channel between said first and second devices, each packet having an associated header and payload, wherein each packet traveling from said first device to said second device is associated with a window of packets;
    third means for employing said second means to transmit a message with respect to plural error conditions with respect to a number of said data packets, wherein said third means includes means for timing transmissions of said message in accordance with each window of packets and providing said message from said second device to said first device via said second means in response thereto and further includes means for sending acknowledgement messages from said second device to said first device specifying packets associated with said window of packets not received by said second device; and
    fourth means for selectively disabling said second means when said first device does not receive one of said acknowledgement messages after a predetermined time interval;
    wherein said predetermined time interval is a function of a window timeout variable,
    wherein said window timeout is greater than N multiplied by a number of packets included in said window of packets divided by the data rate of the communications link between said first device and said second device, wherein N is greater than or equal to 3 and less than or equal to 10, and
    wherein each of said packets includes a header that includes a file parameter and a sequence parameter that specify a file associated with each of said packets and a position in said file of each of said packets, respectively.

2. The system of claim 1 wherein said window of packets is sized in accordance with a data rate and a round trip signal travel time of said channel.

3. The system of claim 1 wherein said third means includes means for combining error messages into a number of response messages having fewer headers than said plurality of packets.

4. The system of claim 1 wherein said packets sent by said second means include data packets associated with said window of packets sent from said first device to said second device, and wherein said response message sent via said third means includes information identifying missing data packets prior to or associated with said window of packets.

5. The system of claim 1 wherein said first means includes Transmission Control Protocol/Internet Protocol (TCP/IP) software on said first device and said second device for establishing a first TCP/IP link from said second device to said first device.

6. The system of claim 5 wherein said first means includes Universal Datagram Protocol (UDP) software on said first device and said second device for facilitating transfer of UDP packets from said first device to said second device.

7. The system of claim 6 wherein said first device is an aircraft or spacecraft, and said second device is a ground controller.

8. The system of claim 6 wherein said asymmetric communications link is a satellite relay.

9. The system of claim 1 wherein said third means further includes means for sending an acknowledgement message from said second device to said first device after receipt by said second device of a predetermined number of packets totaling a size of said window of packets or after a predetermined window timeout, which ever occurs sooner.

10. The system of claim 1 wherein function is (M)× (window timeout), where M is approximately 2, and window timeout is said window timeout variable.

11. The system of claim 1 wherein said system further includes fifth means for assembling packets received by said second device via said second means based on said file parameter and said sequence parameter.

12. The system of claim 11 wherein said first device includes a transmit buffer for transmitting said packets, and said second device includes a receive buffer for receiving said packets.

13. The system of claim 12 wherein a size of said transmit buffer is a function of round trip signal travel time between said first device and said second device, a size associated with said window of packets, and a maximum data rate associated with said channel.

14. The system of claim 13 wherein said transmit buffer is approximately 50 megabytes for a 100 megabits per second channel.

15. The system of claim 13 wherein a size of said receive buffer is approximately equivalent to said size of said transmit buffer.

16. An efficient and reliable communications protocol comprising the steps of:
    creating a listening endpoint for a Transmission Control Protocol/Internet Protocol (TCP/IP) socket via a first communications device;
    connecting a second communications device to said TCP/IP socket of said first communications device;
    sending an initialization message from the second communications device to the first communications device, the initialization message including an Internet Protocol (IP) address, a port number, an acknowledgement window size, and a window time out associated with said second device;
    delivering a return initialization message to the second device from the first device upon receipt of the initialization message by the first device, said return initialization message indicating a maximum size of data packets to be sent, and a sequence number associated with a first data packet to be sent;
    returning an acknowledgement message from the second device to the first device acknowledging missing packets associated with previously sent data packets;

transferring a data packet from said first device to said second device;

checking if the total number of bytes received associated with a current window has reached a window size value or the time elapsed since the last step of returning acknowledgement is greater than a first timeout value, and if so, returning to said step of transferring, otherwise returning false;

determining, when said step of checking returns false, if said first device has received an acknowledgement from said second device for a period of time greater than a second timeout and, if so, returning to said step of returning an acknowledgement, otherwise, returning false;

pausing sending data packets from said first device to said second device when said step of determining returns false; and passing control back to said step of acknowledging upon receipt of an acknowledgement message by said first device from said second device.

* * * * *